(12) United States Patent
Chang et al.

(10) Patent No.: US 7,617,101 B2
(45) Date of Patent: Nov. 10, 2009

(54) METHOD AND SYSTEM FOR UTTERANCE VERIFICATION

(75) Inventors: Sen-Chia Chang, Changhua (TW); Shih-Chieh Chien, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1143 days.

(21) Appl. No.: 10/628,361

(22) Filed: Jul. 29, 2003

(65) Prior Publication Data
US 2004/0204930 A1    Oct. 14, 2004

(30) Foreign Application Priority Data
Apr. 14, 2003   (TW)   ............................. 92108577 A

(51) Int. Cl.
*G10L 15/16*   (2006.01)
(52) U.S. Cl. ................. 704/232; 704/243; 704/244
(58) Field of Classification Search ............... 704/233, 704/234, 236, 251, 256, 249, 250, 231, 232, 704/240, 270, 242, 254, 255, 246, 243, 244, 704/245
See application file for complete search history.

(56) References Cited
U.S. PATENT DOCUMENTS
5,526,465 A * 6/1996 Carey et al. ............... 704/250

| | | | |
|---|---|---|---|
| 5,737,489 A * | 4/1998 | Chou et al. | 704/256 |
| 6,292,778 B1 * | 9/2001 | Sukkar | 704/256.4 |
| 6,772,117 B1 * | 8/2004 | Laurila et al. | 704/233 |
| 7,197,456 B2 * | 3/2007 | Haverinen et al. | 704/233 |

\* cited by examiner

*Primary Examiner*—Huyen X. Vo
(74) *Attorney, Agent, or Firm*—Bacon & Thomas, PLLC

(57) ABSTRACT

A method and system for utterance verification is disclosed. It first extracts a sequence of feature vectors from speech signal. At least one candidate string is obtained after speech recognition. Then, speech signal is segmented into speech segments according to the verification-unit-specified structure of candidate string for making each speech segment corresponding to a verification unit. After calculating the verification feature vectors of speech segments, these verification feature vectors are sequentially used to generate verification scores of speech segments in verification process. This invention uses neural networks for calculating verification scores, where each neural network is a Multi-Layer Perceptron (MLP) developed for each verification unit. Verification score is obtained through using feed-forward process of MLP. Finally, utterance verification score is obtained by combining all verification scores of speech segments and is used to compare with a pre-defined threshold for the decision of acceptance or rejection of the candidate string.

14 Claims, 5 Drawing Sheets

METHOD AND SYSTEM FOR UTTERANCE VERIFICATION

BACKGROUND OF THE INVENTION

1. Field of the Invention

The present invention relates to the technical field of utterance verification and, more particularly, to a method and a system for utterance verification which are adapted to a noisy environment.

2. Description of Related Art

Conventionally, in the field of data processing, an utterance verification technique is employed to verify the correctness of a candidate string which is obtained through conducting speech recognition on a speech segment. Therefore, correct action can be taken on according to the candidate string which is verified and regarded as the correct answer. For example, in voice dialing system, a voice input for a set of telephone number is requested, a digit-string will be recognized and verified for the input speech, and the recognized digit-string will be dialed if it is verified and regarded as the correct answer.

In many well-known utterance verification techniques, the most widely employed techniques are the decoding based approach and a hypothesis testing based approach.

FIG. 1 is a block diagram illustrating a decoding based utterance verification technique. As shown, a word "Hi", denoted by two phonetic symbols "h" and "ai", represented by an input speech 51 has been recognized. In most decoding based systems, "Hi" is taken as a unit for decoding and parameters used for decoding are calculated for the word "Hi". Besides, more than one parameters 52 are usually used in this approach, such as acoustic score 521, language model score 522, N-best information 523, etc included in the parameter set 52. A decoder 53 is then activated to combine these scores for obtaining a verification score 54. Finally, the verification score 54 is compared with a predetermined threshold to decide recognized word "Hi" should be accepted or not. This approach can be implemented by LDA (Linear Discriminative Analysis), decision tree analysis, or neural network. However, various and complicated parameters are required for this approach. It is an extra and time-consuming effort for many speech applications.

FIG. 2 is a block diagram illustrating a hypothesis testing based utterance verification technique. As shown, a word "Hi" represented by an input speech 61 has been recognized. And, the input speech is segmented into sub-word segments of "h" and "ai". Verification model 621 (623) and anti-model 622 (624) of sub-word "h" ("ai") are used to test the sub-word segment of "h" ("ai"). And the resulted log likelihood ratio is regarded as the test score 631 (632) of sub-word "h" ("ai"). The verification score 64 of "Hi" is obtained through combining test scores 631 and 632. Finally, the verification score 64 is compared with a predetermined threshold to decide whether the recognized word "Hi" should be accepted or not. However, the hypothesis testing based utterance verification technique requires verification model and anti-model for each sub-word. And, two tests are required for each sub-word segment. System load will be significant increased by using this approach.

Moreover, both the decoding and hypothesis testing approaches are only applicable to noiseless environment. Hence, verification performance will be degraded greatly in noisy environment. As a result, reliability of recognition system will be poor.

Therefore, it is desirable to provide novel method and system for utterance verification in order to mitigate and/or obviate the aforementioned problems.

SUMMARY OF THE INVENTION

An object of the present invention is to provide a method and a system for utterance verification both being adapted to a noisy environment so as to increase the reliability of speech recognition system.

Another object of the present invention is to provide a method and a system for utterance verification wherein a classifier is provided for each verification unit to decrease system load and increase system performance.

A further object of the present invention is to provide a method and a system for utterance verification both being easily integrated to various speech recognition systems.

In one aspect of the present invention there is to provide a method for utterance verification comprising the steps of extracting a sequence of feature vectors from an input speech; inputting the sequence of feature vectors to a speech recognizer for obtaining at least one candidate string; segmenting the input speech into at least one speech segment according to the content of candidate string, which comprises individual recognition units, wherein each speech segment corresponds to a recognition unit and each recognition unit corresponds to a verification unit; generating a sequence of verification feature vectors according to the sequence of feature vectors of the speech segments normalized by the normalization parameters of the verification unit corresponding to the speech segments; utilizing a classifier for each speech segment to calculate verification scores corresponding to the speech segments according to the sequence of verification feature vectors corresponding to each speech segment; combining the verification scores of all speech segments for obtaining an utterance verification score of candidate string; and comparing the utterance verification score of candidate string with a predetermined threshold so as to accept the candidate string if the utterance verification score is larger than the predetermined threshold.

In another aspect of the present invention there is to provide a system for utterance verification comprising a feature vector extraction module for extracting a sequence of feature vectors from an input speech; a speech recognition module for obtaining at least one candidate string from the sequence of feature vectors; a speech segmentation module for segmenting the input speech into at least one speech segment according to the content of candidate string, which comprises individual recognition units, wherein each speech segment corresponds to a recognition unit and each recognition unit corresponds to a verification unit; a verification feature vector generation module for generating a sequence of verification feature vectors according to the sequence of feature vectors of the speech segments normalized by the normalization parameters of the verification unit corresponding to the speech segments; a verification score calculation module for utilizing a classifier for each speech segment to calculate verification scores corresponding to the speech segments according to the sequence of verification feature vectors corresponding to each speech segment; a verification score combination module for combining the verification scores of all speech segments for obtaining an utterance verification score of candidate string; and a decision module for comparing the utterance verification score of candidate string with a predetermined threshold so as to accept the candidate string if the utterance verification score is larger than the predetermined threshold.

Other objects, advantages, and novel features of the invention will become more apparent from the detailed description when taken in conjunction with the accompanying drawings.

DETAILED DESCRIPTION OF THE PREFERRED EMBODIMENT

Figure 1:
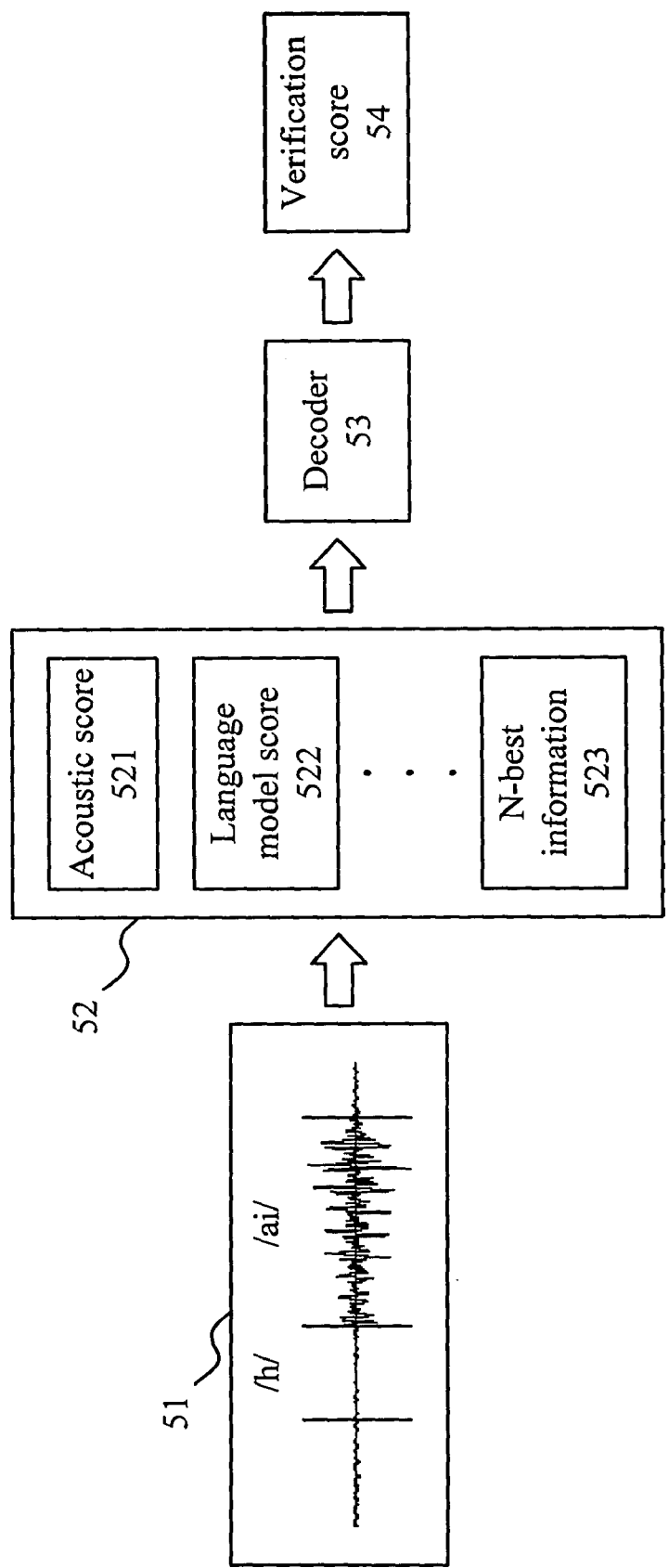
FIG. 1 is a block diagram illustrating a conventional decoding based utterance verification technique.
Figure 2:
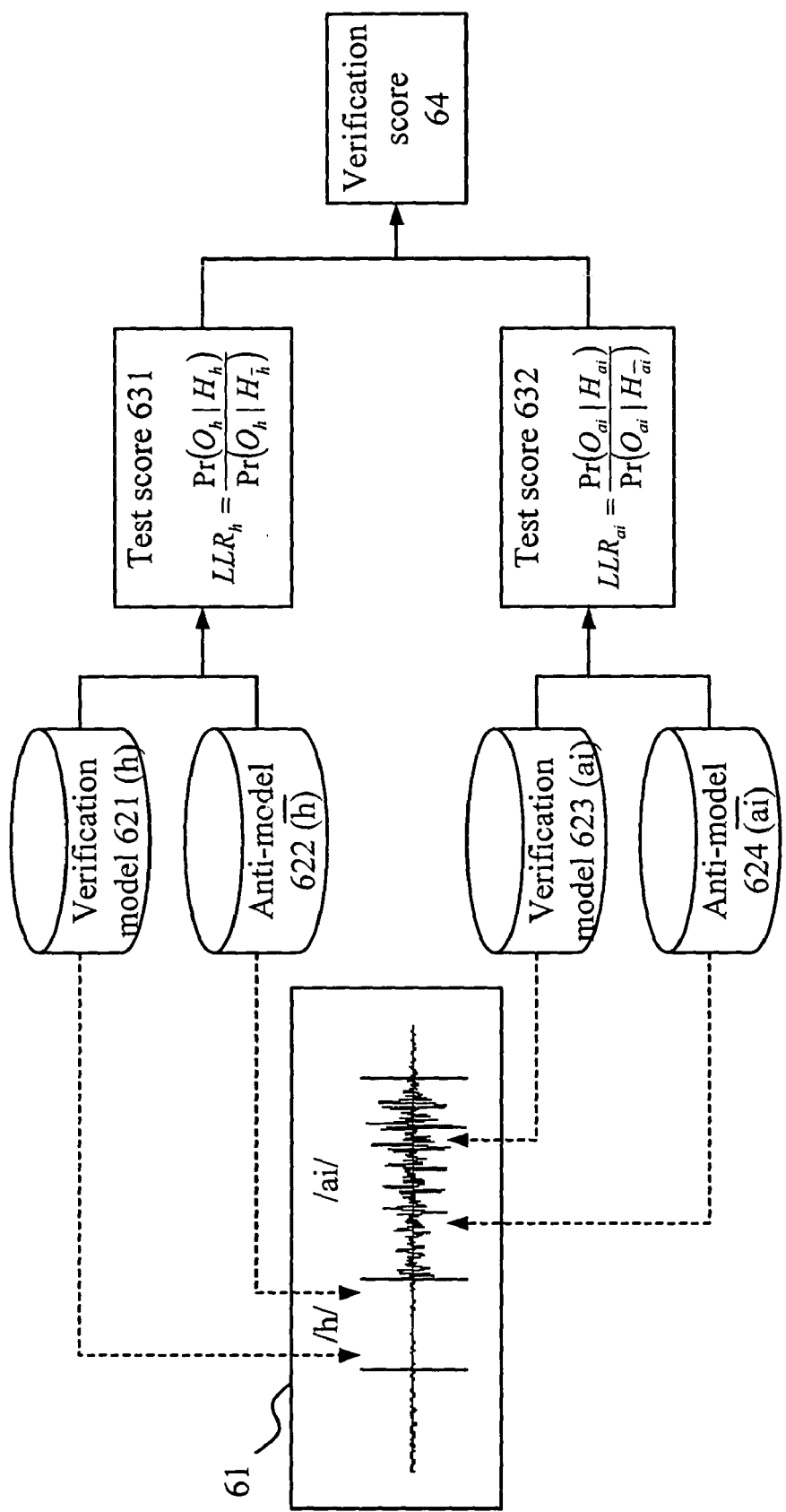
FIG. 2 is a block diagram illustrating a conventional hypothesis testing based utterance verification technique.
Figure 3:
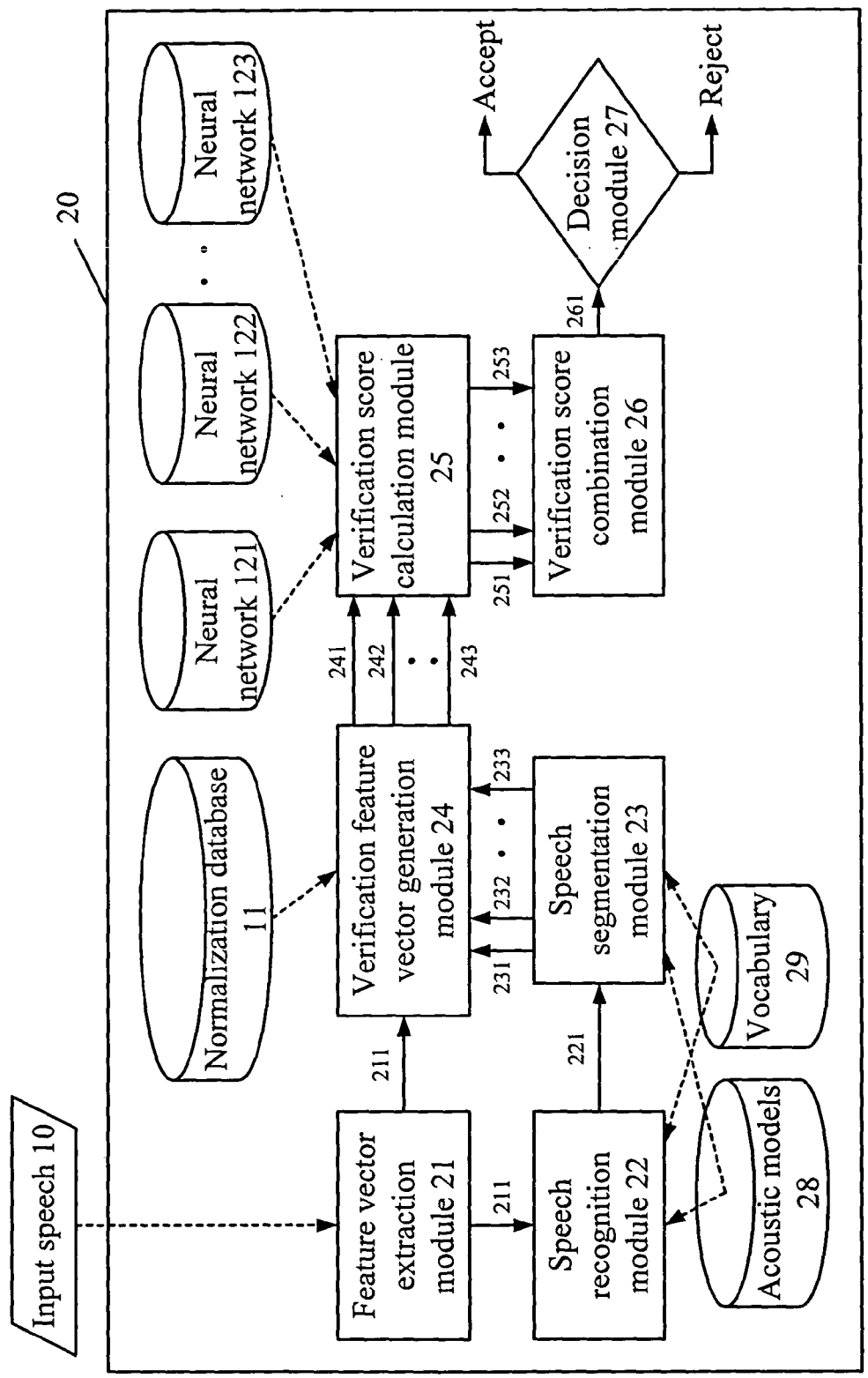
FIG. 3 is a block diagram illustrating a system for utterance verification according to the present invention.

With reference to FIG. 3, there is shown a computer system 20 for implementing utterance verification in accordance with the invention. The computer system 20 is enabled to perform an utterance verification process on an input speech 10. The system 20 comprises a feature vector extraction module 21, a speech recognition module 22, an acoustic models 28, a vocabulary 29 having a plurality of words, a speech segmentation module 23, a verification feature vector generation module 24, a normalization database 11 having a plurality of normalization parameters, a verification score combination module 26, a decision module 27, and a verification score calculation module 25. The system 20 further comprises a plurality of neural networks 121, 122, and 123 . . . etc. to be used for verification score calculation. In this embodiment, the neural networks are carried out by an MLP (multi-layer perceptron).

Figure 4:
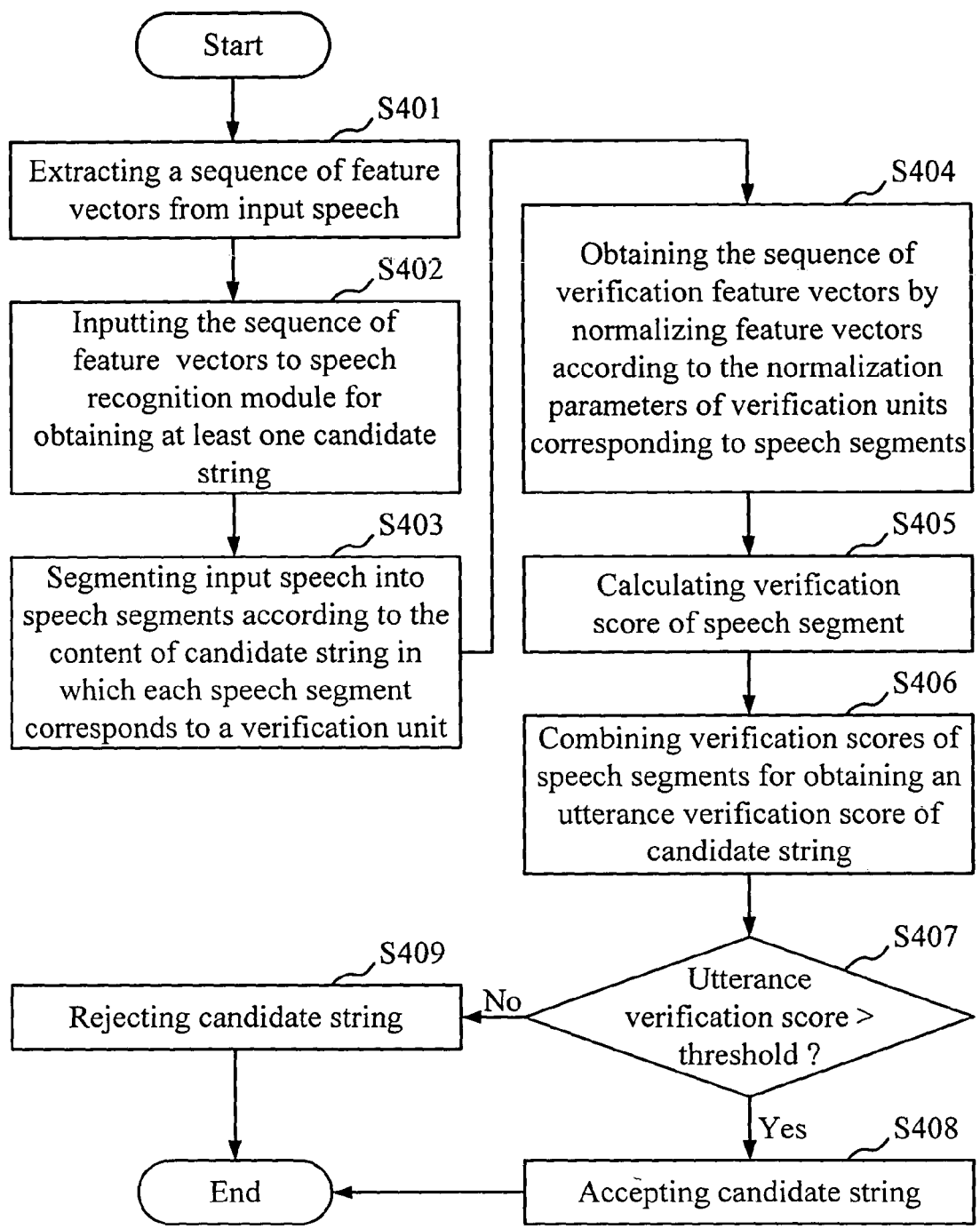
FIG. 4 is a flow chart illustrating a process of utterance verification according to the present invention.

With reference to FIG. 4, there is shown a flow chart illustrating a process of utterance verification according to the invention. First, the input speech 10 is windowed into a plurality of frames in feature vector extraction module 21 for extracting a sequence of feature vectors 211 (step S401). Each feature vector is comprised of a plurality of dimensional values in the sequence of feature vectors 211. In this embodiment, the frame length is 160 points (i.e., 20 ms). The overlapped length of frame is 80 points (i.e., 10 ms). Also, the Hamming window is applied to smooth each data frame. Furthermore, each feature vector comprises 26 dimensional values including 12 Mel-ceptral coefficients, 12 delta-ceptral coefficients, a delta-log-energy, and a delta-delta-log-energy. In this embodiment, a ceptral mean normalization is used for channel compensation. The extracted sequence of feature vectors 211 is then inputted to the speech recognition module 22 for obtaining at lease one candidate string 221 (step S402). In the speech recognition module 22, the HMM (Hidden Markov model) based acoustic models 28 and a vocabulary 29 having a plurality of words are used in recognition for generating at least one candidate string 221. Next, the speech segmentation module 23 segments the input speech 10 into a plurality of speech segments 231, 232, and 233 according to the content of the candidate string 221 (step S403), where the content of candidate string 221 is represented by individual recognition units, and, each recognition unit corresponds to a verification unit. As a result, each of the speech segments 231, 232, and 233 corresponds to a verification unit. In a case that the candidate string 221 is an English word, each speech segment, 231, 232, and 233, can be corresponded to a verification unit. For example, "sky" will be segmented into three speech segments denoted by the verification unit of "s", "k", and "ai".

Then, the sequence of feature vectors 211 associated with the speech segments 231, 232, and 233 is sent to the verification feature vector generation module 24 for generating a sequence of verification feature vectors 241, 242, and 243. Note that the generation of the sequence of verification feature vectors 241, 242, and 243 is done by normalizing the sequence of feature vectors 211 according to the normalization parameters of verification unit corresponding to speech segment 231, 232, and 233. The normalization parameters of the verification unit are the means and standard deviations of feature vectors through calculating feature vectors corresponding to the verification unit from training data in advance. The normalization parameters are then stored in the normalization database 11. Therefore, as to the speech segment 231, the sequence of verification feature vectors 241 is obtained by normalizing the sequence of feature vectors 211 corresponding to the speech segment 231 by means of normalization parameters of the verification unit corresponding to the speech segment 231 (step S404). Also, the sequence of verification feature vectors 241 comprises a plurality of dimensional values. Likewise, the sequence of verification feature vectors 242 and 243 corresponding to the speech segments 232, 233 can also be obtained respectively. Next, the verification feature vectors 241, 242, and 243 are sequentially inputted to the verification score calculation module 25 for calculating verification scores 251, 252, and 253. In this process, the neural networks 121, 122, and 123 corresponding to the verification units are applied, where these verification units are associated with the speech segments 231, 232, and 233. Each of the neural networks 121, 122, and 123 is implemented by an MLP. Note that the calculation of the verification scores 251, 252, and 253 is done by performing a feed-forward processing on the neural networks 121, 122, and 123 using the verification feature vectors 241, 242, and 243, respectively (step S405). A description about calculating the verification score 251 using the neural network 121 is given hereinafter.

Figure 5:
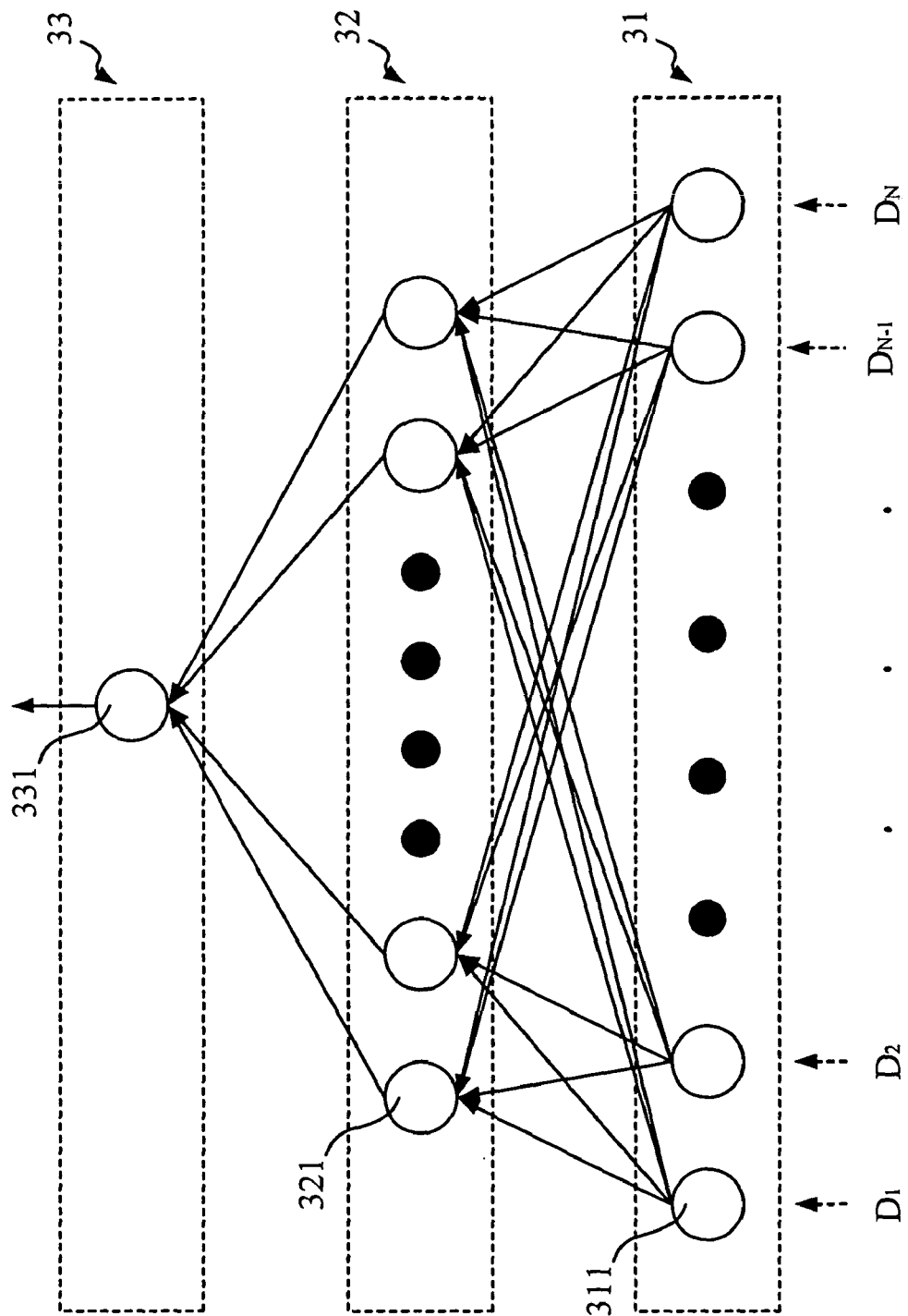
FIG. 5 presents schematically a neural network according to the present invention.

With reference to FIG. 5, it shows schematically the neural network 121. The neural network 121 is an MLP and comprises an input layer 31, a hidden layer 32, and an output layer 33. Also, each verification unit corresponds to a neural network. Input neurons 311 of the input layer 31 sequentially receive feature values $D_i$ ($1 \leq i \leq N$) of each verification feature vector of the sequence of the verification feature vectors 241 and then output the feature values $D_i$ to the hidden layer 32. Hidden neurons 321 of the hidden layer 32 sequentially receive all of the output values outputted from the input layer 31, calculate the corresponding result for each hidden neuron, and output these results to the output layer 33. The output layer 33 uses only one output neuron 331 to receive all of the output values outputted from the hidden layer 32, calculates a verification result, and outputs this verification result. Therefore, the verification results of the sequence of verification feature vectors 241 can be obtained according to the aforesaid feed-forward processing, and the verification score 251 is the mean of the verification results.

As to each output neuron of the neural network 121, the following equation is used to calculate $out_j$ except for those with the input neuron directly used to output the feature value of the verification feature vector:

$$out_j = \frac{1}{1 + \exp\left(-\sum_i w_{ji} out_i + b_j\right)},$$

wherein $out_j$ is the output value of the j-th neuron of the present layer (hidden layer 32 or output layer 33), $out_i$ is the output value of the i-th neuron of the former layer (input layer 31 or hidden layer 32), $w_{ji}$ is a weight from the i-th neuron of the former layer to the j-th neuron of the present layer, and $b_j$ is a bias of the j-th neuron of the present layer.

After calculating all verification scores 251, 252, and 253, the verification score combination module 26 then calculates a mean of the verification scores 251, 252, and 253 to obtain an utterance verification score 261 of the candidate string 221 (step S406). Finally, the decision module 27 compares the utterance verification score 261 with a predetermined threshold (step S407). The system 20 will accept the candidate string 221 if the utterance verification score 261 is larger than the threshold (step S408); otherwise the candidate string 221 is rejected (step S409).

For enabling the MLP to verify whether the speech segment is the corresponding verification unit or not according to the aforesaid sequence of verification feature vectors in this embodiment, the training data of the MLP used for training a specific verification unit comprises the sequence of verification feature vectors of the speech segments corresponding to the verification unit and those not corresponding to the verification unit for enabling the MLP to learn the difference between each other. In the training process, a corresponding target value is firstly set for the sequence of the verification feature vectors of speech segments. Then, an error back-propagation algorithm is used to train the MLP. The weights and biases of the MLP can be adjusted by reducing the mean square error between the real verification score output and the desired verification score. For example, for training an MLP corresponding to a verification unit of "u", the training speech segments include the speech segments corresponding to the verification unit of "u" and the speech segments that are not corresponding to the verification unit of "u". The desired verification score is 1 if the speech segment corresponds to the verification unit of "u". Otherwise, the desired verification score is 0. In such a manner, a real verification score output of the MLP will approximate to the target value by iteratively learning. Therefore, the MLP can verify whether the speech segment is the corresponding verification unit or not by using the sequence of verification feature vectors.

For enabling both the method and system of the invention to be adapted to a noisy environment, the training data used for training the MLPs are pre-corrupted by noise with different power levels of SNR (Signal to Noise Ratio). For example, the speech segments corrupted by in-car noise with SNRs of 9 dB, 3 dB, 0 dB, −3 dB, and −9 dB are used to train the MLPs. As such, the MLP can learn voice characteristics of the speech segments under different levels of in-car noises. By utilizing this, both the method and system of the invention can determine whether a speech segment corrupted by noise is a corresponding verification unit or not.

Although the present invention has been explained in relation to its preferred embodiment, it is to be understood that many other possible modifications and variations can be made without departing from the spirit and scope of the invention as hereinafter claimed.

What is claimed is:

1. A method for utterance verification implemented in a computer system having a feature vector extraction module, a speech recognition module, a speech segmentation module, a verification feature vector generation module, a verification score calculation module, a verification score combination module, and a decision module, the method comprising the steps of:
    (A) extracting a sequence of feature vectors from an input speech by the feature vector extraction module;
    (B) inputting the sequence of feature vectors to the speech recognition module for obtaining at least one candidate string;
    (C) segmenting the input speech into at least one speech segment by the speech segmentation module according to the content of candidate string, which comprises individual recognition units, wherein each speech segment corresponds to a recognition unit and each recognition unit corresponds to a verification unit;
    (D) generating a sequence of verification feature vectors for each speech segment by the verification feature vector generation module according to the sequence of feature vectors of the speech segment, wherein the verification feature vectors are generated by normalizing the feature vectors using the normalization parameters of the verification unit corresponding to the speech segment, the normalization parameters of the verification unit are the means and the standard deviations of the feature vectors corresponding to the verification unit in training data, and these parameters are calculated in advance of runtime;
    (E) utilizing a verification-unit corresponded classifier for each speech segment to calculate the verification score by the verification score calculation module, where the sequence of verification feature vectors of the speech segment is used as the input of the classifier, wherein said classifier is a neural network and the neural network is an MLP (multi-layer perceptron), wherein the MLP is used to calculate the verification score by inputting the verification feature vector and performing a feed-forward operation, and wherein the verification score of a speech segment is the mean of the verification scores of the sequence of verification feature vectors corresponding to the speech segment;
    (F) combining the verification scores of all speech segments for obtaining an utterance verification score of the candidate string by the verification score combination module; and
    (G) comparing the utterance verification score of the candidate string with a predetermined threshold by the decision module so as to accept the candidate string if the utterance verification score is larger than the predetermined threshold.

2. The method as claimed in claim 1, wherein the MLP is trained by using an error back-propagation algorithm to reduce the mean square error between the verification score output of the MLP and the target value.

3. The method as claimed in claim 2, wherein the MLP corresponding to the verification unit is trained by inputting the sequences of verification feature vectors of the speech segments corresponding to the verification unit and the sequences of verification feature vectors of the speech segments not corresponding to the verification unit.

4. The method as claimed in claim 3, wherein the target value is 1 if the speech segment corresponds to the verification unit and which is 0 if the speech segment does not correspond to the verification unit.

5. The method as claimed in claim 3, wherein the speech segments used for training are corrupted by noise with different power levels of SNR (Signal to Noise Ratio).

6. The method as claimed in claim 1, wherein in step (F), the utterance verification score of the candidate string is the mean of the verification scores of the speech segments in the input speech.

7. The method as claimed in claim 1, wherein the input speech is corrupted by noise with different power levels of SNR (Signal to Noise Ratio).

8. A system for utterance verification comprising:
software modules implemented in a computer system, the software modules including:
a feature vector extraction module for extracting a sequence of feature vectors from an input speech;
a speech recognition module for obtaining at least one candidate string by inputting the sequence of feature vectors;
a speech segmentation module for segmenting the input speech into at least one speech segment according to the content of candidate string, which comprises individual recognition units, wherein each speech segment corresponds to a recognition unit and each recognition unit corresponds to a verification unit;
a verification feature vector generation module for generating a sequence of verification feature vectors for each speech segment according to the sequence of feature vectors of the speech segment, wherein the verification feature vectors are generated by normalizing the feature vectors using the normalization parameters of the verification unit corresponding to the speech segment, the normalization parameters of the verification unit are the means and the standard deviations of the feature vectors corresponding to the verification unit in training data, and these parameters are calculated in advance of runtime;
a verification score calculation module for utilizing a verificationunit corresponded classifier for each speech segment to calculate the verification score, where the sequence of verification feature vectors of the speech segment is used as the input of the classifier, wherein the classifier is a neural network, and the neural network is an MLP (multi-layer perceptron), wherein the MLP is used to calculate the verification score by inputting the verification feature vector and performing a feed-forward operation, and wherein the verification score of a speech segment is the mean of the verification scores of the sequence of verification feature vectors corresponding to the speech segment;
a verification score combination module for combining the verification scores of all speech segments for obtaining an utterance verification score of the candidate string; and
a decision module for comparing the utterance verification score of the candidate string with a predetermined threshold so as to accept the candidate string if the utterance verification score is larger than the predetermined threshold.

9. The system as claimed in claim 8, wherein the MLP is trained by using an error back-propagation algorithm to reduce the mean square error between the verification score output of the MLP and the target value.

10. The system as claimed in claim 9, wherein the MLP corresponding to the verification unit is trained by inputting the sequences of verification feature vectors of the speech segments corresponding to the verification unit and the sequences of verification feature vectors of the speech segments not corresponding to the verification unit.

11. The system as claimed in claim 10, wherein the target value is 1 if the speech segment corresponds to the verification unit and which is 0 if the speech segment does not correspond to the verification unit.

12. The method as claimed in claim 10, wherein the speech segments used for training are corrupted by noise with different power levels of SNR (Signal to Noise Ratio).

13. The system as claimed in claim 8, wherein in the verification score combination module, the utterance verification score of the candidate string is the mean of the verification scores of the speech segments in the input speech.

14. The system as claimed in claim 8, wherein the input speech is corrupted by noise with different power levels of SNR (Signal to Noise Ratio).

* * * * *

UNITED STATES PATENT AND TRADEMARK OFFICE
CERTIFICATE OF CORRECTION

PATENT NO. : 7,617,101 B2 Page 1 of 1
APPLICATION NO. : 10/628361
DATED : November 10, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1811 days.

Signed and Sealed this

Nineteenth Day of October, 2010

David J. Kappos
*Director of the United States Patent and Trademark Office*